March 20, 1956     W. E. HATCH     2,738,914

FRUIT AND VEGETABLE CONTAINER

Filed Oct. 31, 1950

INVENTOR.
WILFRED E. HATCH
BY
*Arthur G. Connolly*
HIS ATTORNEY.

United States Patent Office 2,738,914
Patented Mar. 20, 1956

2,738,914
FRUIT AND VEGETABLE CONTAINER

Wilfred E. Hatch, Waterville, Maine, assignor to Keyes Fibre Company, Portland, Maine, a corporation of Maine Application October 31, 1950, Serial No. 193,230

3 Claims. (Cl. 229—2.5)

The present invention relates to fruit and vegetable containers or so-called berry boxes made of molded pulp. Although such containers have been previously suggested as in U. S. Patent No. 1,701,238 granted February 5, 1929, to E. P. Kennedy, such prior art constructions have not been too satisfactory largely because of adverse nesting characteristics. Thus the containers are generally shipped to their user in nested condition to save space, and the removal of the individual containers from the top of the nest is quite awkward and usually a two-handed operation sometimes resulting in tearing of the container.

Among the objects of the present invention are the provision of fruit and vegetable containers of this type but not having the above nesting difficulties.

Further objects of the present invention include the provision of molded pulp types of berry boxes that have good nesting characteristics as well as suitable tear resistance and require a minimum of molding materials.

The above as well as additional objects of the present invention will be more clearly understood from the following description of several of its embodiments, reference being made to the accompanying drawing wherein.

Figure 1:
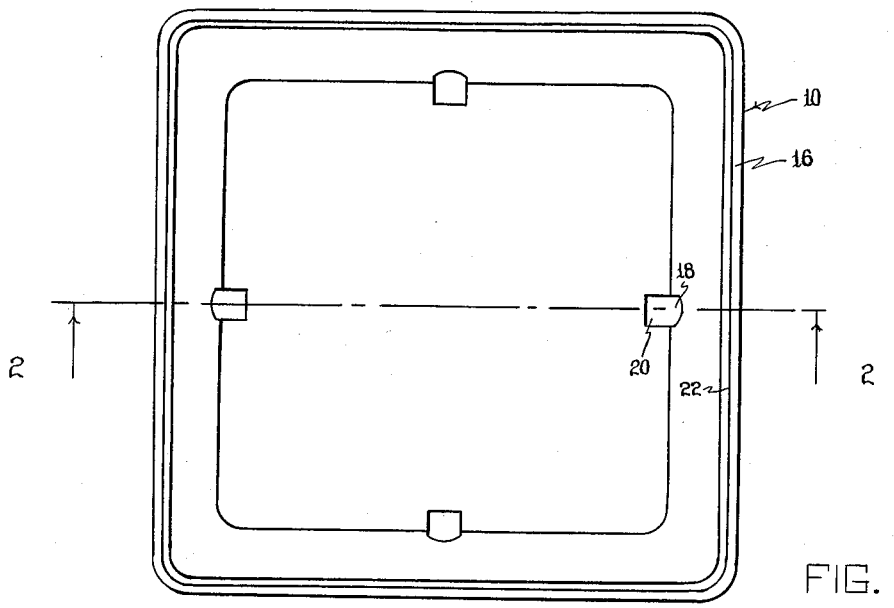
Fig. 1 is a plan view of a berry box of molded pulp in accordance with the present invention.

According to the present invention the nesting characteristics of open top molded pulp containers for fruits and vegetables are found to be considerably improved without any substantial increase in container cost by providing at least portions of the side walls of the container with outwardly directed offsets forming shoulders that define nesting stops beyond which one such container will not drop into another. The shoulders may be located at a level convenient to keep the container walls from frictionally jamming against the walls of an adjacent nested container. The quantity of molding materials required to form the container can be reduced by shaping the walls between the shoulders and the tops so that they have a substantially flat vertical section. In addition the shoulder, particularly if it extends completely around the container periphery, provides an appreciable reinforcement of the upper edges so that strengthening flanges can be appreciably reduced and a significant quantity of molding materials can actually be saved. Slots in the walls and/or bottom of the containers can be provided for ventilation or washing of the fruits or vegetables held in the container.

Referring to the drawings the berry box there shown at 10 has a bottom 12 and side walls 14 that extend upwardly from the bottom 12 and taper outwardly terminating in an upper flange 16. Slots 18 in the lower portion of each wall 14 extend partially into the bottom as shown at 20.

Figure 3:
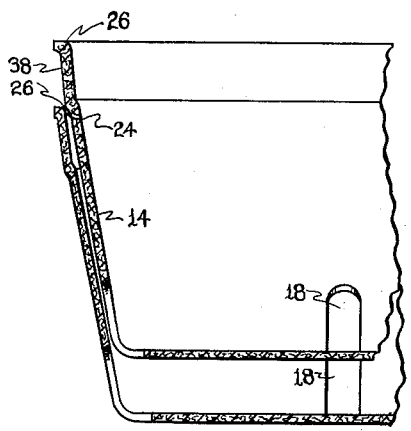
Fig. 3 is a fragmentary sectional view showing berry boxes of the present invention in nested condition.

Near the tops of the walls an outwardly directed offset 22 provides an external shoulder 24 that projects a distance slightly beyond that of the inner edge 26 of the top 16. The shoulder thereby defines a nesting stop or limit below which one such container will not drop into another, as indicated at Fig. 3. Although the shoulder 24 is shown in the drawings as extending completely around the periphery of the box, it can be omitted from many portions and need only be provided in two opposing walls 14 and even here can be in the form of one or a series of intermittent small offsets extending along these walls.

For economy of materials it is preferred that the portion of the wall between the top flange 16 and the offset 22 be of generally flat vertical section and in addition the offsets should be relatively shallow. With such a construction it has been found that the marginal strengthening flange 16 which is necessary for increasing the tear resistance of the upper edge, can be considerably reduced as shown and need only project a distance not exceeding about one-half the thickness of the wall itself.

Figure 2:
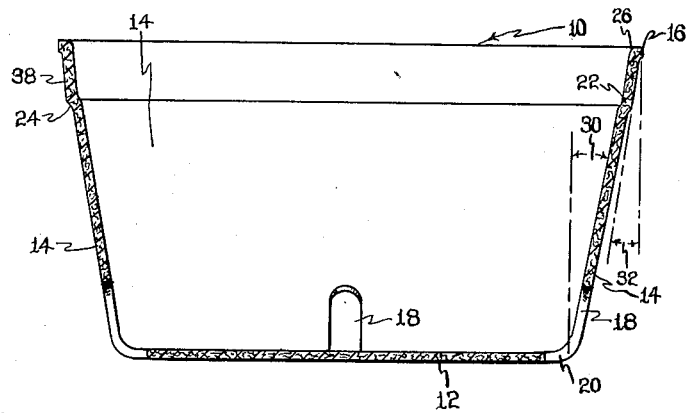
Fig. 2 is a sectional view along the line 2—2 of the box of Fig. 1.

Nesting is made possible by the taper of walls 14 indicated by angle 30. In other words the box of Figs. 1 and 2 has the general shape of the inverted frustum of a square pyramid. Ten degrees is a suitable value for the angle 30 although it can be varied somewhat, depending upon the height of the boxes and the walls thickness, between about five and fifteen degrees. For simplicity in molding, the upper wall ends including edge 26 are prolongations of the portion of the wall below shoulders 24, and above the shoulders the walls are generally flat with an inclination angle 32 less than angle 30. Where the shoulders 24 are about one-fifth of the way down from the tops of the walls, as in Fig. 2, angle 32 can be about 50 to 90 percent of angle 30 depending upon the depth of the offset, and seven degrees has been found satisfactory with the embodiment in the scale shown in the figures.

The position of the shoulder 24 along the wall height may be varied in accordance with the desired ease of removing an individual box from the top of a stack. The collar 38 formed between the shoulder 24 and the box top, projects out from nested condition so that it can be readily grasped and forms a grip portion by which the upper box can be easily lifted out. By locating the shoulder so that the walls of one box do not jam against the walls of the adjacent boxes of the nest, the box removal is simply effected with a single hand and without any significant tugging. This diminished resistance to de-nesting further decreases the tear resistance required. In general the position of the shoulder can vary from about one-tenth to about one-third down from the wall tops, depending upon the taper and thickness of the walls. A collar 38 having a height of at least about three-eighths of an inch is preferred.

The container of the present invention is readily molded, as by the molding technique described in the above-identified Kennedy patent except that suitable provision is made for the offset collar. Thus the pulp mold can have the required shape imparted by splitting it at the offset to provide two separable portions each holding a separate pulp screen wire mesh having edges extending into the split and clamped together, as shown for example in U. S. Patent No. 2,424,189 granted July 15, 1947, to W. H. Randall.

The molding materials can be of any suitable type such as the conventional pulp slurry with or without added resin content. A small amount—2 to 5% for example—of a resin such as a phenol-formaldehyde condensation product or a heavy rosin size content will give the molded container a desirable water-repellency.

As many apparently widely different embodiments of this invention may be made without departing from the spirit and scope hereof, it is to be understood that the invention is not limited to the specific embodiments hereof, except as defined in the appended claims.

What is claimed is:

1. A molded pulp fruit and vegetable container comprising a substantially square, flat base and four side walls of substantially uniform thickness terminating in upper edge portions defining a generally rectangular open top for said container, said side walls extending upwardly and outwardly from said base, an outwardly extending lateral flange projecting straight out from the upper edge portion of each of said side walls, an offset portion forming a shoulder provided in the upper portion of each of said side walls below and spaced from the corresponding lateral flange, each of said offset portions extending laterally from a plane which is inward of the inner surface of its corresponding upper edge portion to a plane which perpendicularly intersects the lateral plane extending between said inner surface of said upper edge portion and the outer surface of the flange extending therefrom, the outer surface of said offset portion lying in substantially the same plane as the inner surface of said upper edge portion.

2. The container of claim 1 wherein at least one slot is provided in said container, said slot extending from a portion of said base adjacent the periphery thereof into the lower portion of a side wall.

3. The container of claim 1 wherein that portion of each of said side walls which lies between the lateral flange and the offset portion thereof is inclined outwardly about seven degrees from the vertical plane and wherein that portion of each of said side walls which lies between the offset portion thereof and the base is inclined outwardly about ten degrees from the vertical plane.

References Cited in the file of this patent

UNITED STATES PATENTS

| Number | Name | Date |
|---|---|---|
| 112,477 | Merrill | Mar. 7, 1871 |
| 215,976 | Ritchie | May 27, 1879 |
| 622,921 | Fuller | Apr. 11, 1899 |
| 885,887 | Taylor | Apr. 28, 1908 |
| 1,908,806 | Allen | May 16, 1933 |
| 1,937,402 | Cherry | Nov. 28, 1933 |
| 1,986,824 | Keiding | Jan. 8, 1935 |
| 2,345,876 | Kohrtz | Apr. 4, 1944 |
| 2,375,056 | Wesselman | May 1, 1945 |
| 2,415,323 | Wilcox | Feb. 4, 1947 |
| 2,418,248 | Denton | Apr. 1, 1947 |
| 2,435,906 | Shapiro | Feb. 10, 1948 |
| 2,530,124 | Kieckhefer | Nov. 14, 1950 |
| 2,561,262 | Ziska | July 17, 1951 |
| 2,621,847 | Stefanich | Dec. 16, 1952 |

FOREIGN PATENTS

| Number | Country | Date |
|---|---|---|
| 14,572 | Great Britain | June 22, 1909 |
| 930,555 | France | Aug. 18, 1947 |